United States Patent [19]
Shantzis

[11] Patent Number: 5,645,172
[45] Date of Patent: Jul. 8, 1997

[54] SEPARATED WASTE COLLECTION CONTROL FOR MULTISTORY BUILDING

[76] Inventor: Mark D. Shantzis, 6061 Collins Ave., #6F, Miami Beach, Fla. 33147

[21] Appl. No.: 521,882

[22] Filed: Aug. 31, 1995

[51] Int. Cl.$^6$ ................................................. B07C 7/04
[52] U.S. Cl. ..................... 209/703; 209/704; 209/706; 209/930; 209/942
[58] Field of Search ................................. 209/702, 703, 209/704, 706, 930, 942; 100/221, 223, 224

[56] References Cited

U.S. PATENT DOCUMENTS

| | | | |
|---|---|---|---|
| 5,031,829 | 7/1991 | Shantzis | 232/43.2 |
| 5,190,165 | 3/1993 | Garfield, Jr. | 209/930 X |
| 5,236,136 | 8/1993 | McCarty et al. | 209/930 X |
| 5,551,576 | 9/1996 | Importico | 209/942 X |

FOREIGN PATENT DOCUMENTS

WO92/01615  6/1992  WIPO .

Primary Examiner—David H. Bollinger
Attorney, Agent, or Firm—Alvin S. Blum

[57] ABSTRACT

A system uses a single chute in a multi-story building to collect into separate large receptacles different categories of wastes already separated by the tenant for recycling. A turntable carries a large receptacle for each category of waste. Controls on each floor enables a tenant to operate the turntable to position a selected receptacle beneath the turntable to receive a particular category of waste. A microprocessor controller and interlocks on the access doors prevent conflicts between floors. A reciprocating ram automatically compacts the waste in the receptacle after a predetermined number of deposits into the receptacle. The compaction operation is delayed by preset time intervals to avoid conflicts with tenant use. One of those time intervals is proportional to the floor elevation to give waste a time to fall though the chute. The compression apparatus may be arranged to apply different compressive forces to different types of waste and to signal when a container is full.

19 Claims, 2 Drawing Sheets

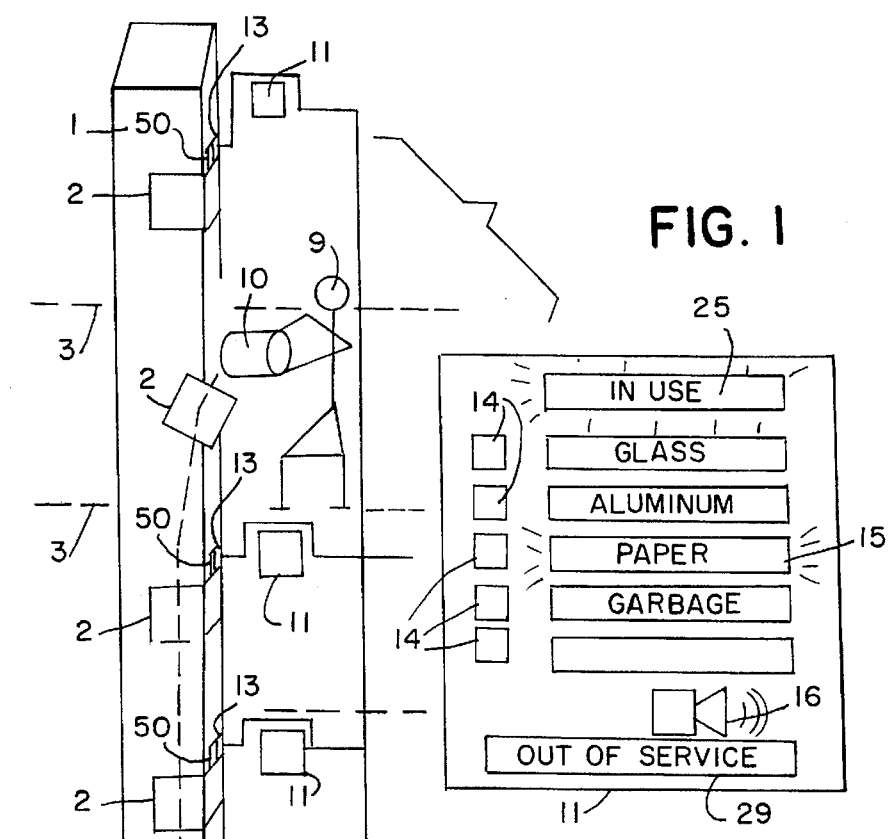
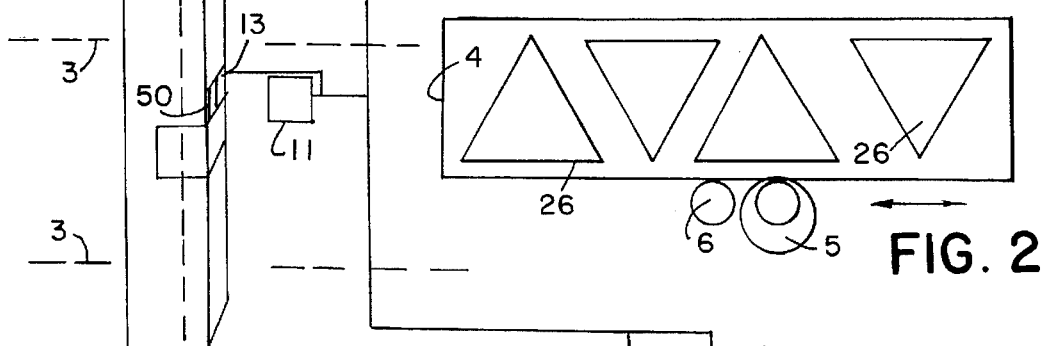
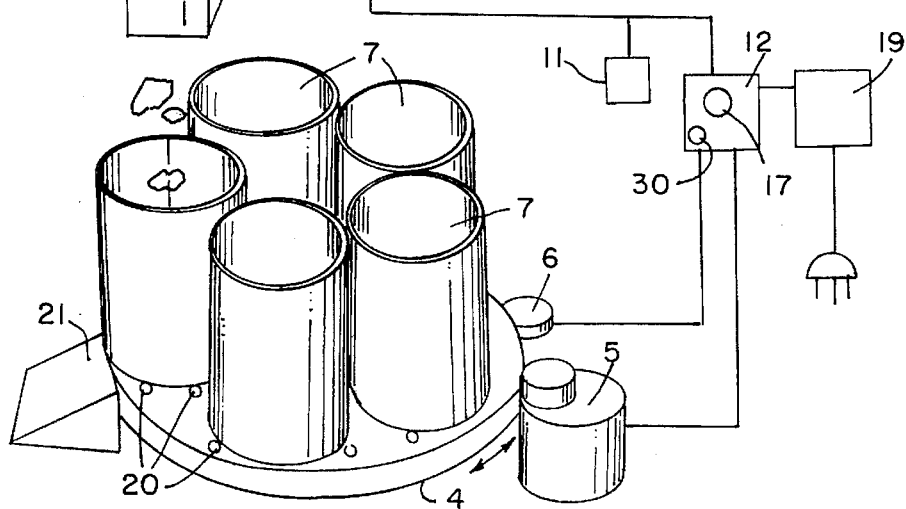
FIG. 1
FIG. 2

SEPARATED WASTE COLLECTION CONTROL FOR MULTISTORY BUILDING

TECHNICAL FIELD

My invention relates to a tenant-controlled delivery of different categories of solid wastes into different containers for recycling that are selectively positioned beneath a single trash chute in a multi-story building and more particularly to a control system therefor to ensure that an appropriate container will be in place promptly and certain wastes will be compacted as required without conflict with tenant use.

BACKGROUND ART

U.S. Pat. No. 5,031,829 issued Jul. 16, 1991 to the applicant discloses a system using a single chute in a multi-story building to collect into separate large receptacles different categories of wastes already separated by the tenant for recycling. A turntable carries a large receptacle for each category of waste. Control means on each floor enables a tenant to operate the turntable remotely to position a selected receptacle beneath the chute to receive a particular category of waste. A controller and interlocks on the chute access doors prevent conflicts between floors.

PCT international application Publication No. WO 92/01615 of 6 Feb. 1992 by applicant discloses a reciprocating ram to compress the contents of a receptacle so that the receptacle will hold more waste before replacement is required. After waste has been added to a receptacle, if it is of the type to be compressed, the receptacle is moved beneath the ram, the ram is forced down to compress the contents and then retracted.

Because a low power gearmotor is employed to generate considerable pressure at low cost, the reciprocating ram motion is slow. The system is out of use during the time the receptacle is moved to the ram and the ram is operating. Tenants waiting to deposit waste become impatient and are tempted to comingle all their different wastes into one receptacle if they are forced to wait while compacting takes place. The enhanced control system of this invention overcomes this problem by eliminating much tenant waiting.

DISCLOSURE OF THE INVENTION

It is accordingly an object of the invention to provide a system that allows the tenant to separate non-comingled recyclables conveniently by duplicating the current habitual act of carrying a basket of waste to the trash chute and dumping the waste.

By causing the tenant to separate recyclables, the invention avoids the labor cost to separate recyclables later, avoids the labor cost to pick up containers on each floor, and avoids the labor cost of separating the waste at a single central location. It is another object to compact the waste within the receptacles as needed, so that the system is less frequently out of service while the full receptacles are replaced and the cost of disposal is significantly reduced since disposal of waste may be on a volume fee basis. It is another object that the control system of the invention prevent conflicts between users on different floors, while keeping the waiting time to an absolute minimum.

It is yet another object of the invention that the control system regulate the compaction force to a preset limit and indicate when a receptacle is full.

The system of the invention includes a single vertical waste chute accessed by a door at each floor to take advantage of existing structures and reduce costs and space in new construction. At the bottom of the chute, a motor moves a plurality of waste receptacles, one dedicated to each type of waste. Control means at each floor selects a particular receptacle to be moved to a position beneath the chute to receive a particular type of waste material.

Controls and interconnecting means prevent movement when a door is open, indicate to each floor which receptacle is beneath the chute at any time to prevent errors, and prevent conflicts of control between floors. The access doors are provided with automatic closers well known in the art. A sensor at each door indicates to the controller when a door closes. The control will then prevent any turntable motion for a falling time interval after the door closes. This failing time interval is related to the elevation of the door to ensure that the waste will have time to reach the receptacle before the turntable will move to any other position. The door closing signal may start another time interval, the user time interval. This is longer than the falling time interval. It ensures that the user who has just closed the door will retain control long enough to select another category before some other tenant on another floor gets control.

To overcome the problems associated with time lost to compaction, the control system of the invention may not compact every time a receptacle is used. Instead, it counts the number of times a particular type receptacle is used and only compacts after a preset number of uses. Certain types of receptacles, such as for glass, may never be campacted, while others such as general garbage, may be compacted often. The control counts one use of a receptacle when a door closing signal is received and a particular receptacle was beneath the chute at the time. Movement to the compacter is delayed until a preset time interval after the door closes. This compaction time interval is generally longer than the user time interval, so that a waiting tenant can gain control prior to compaction movement and operation. The compaction operation is held until tenant use ceases. The compaction control means includes means for compacting to a preset force, or compacting to different forces for different types of waste, and means for sensing and signalling when a receptacle is full.

These and other advantages, objects and features of the invention will become more apparent when the detailed description is considered in conjunction with the drawings.

BRIEF DESCRIPTION OF DRAWINGS

The details of my invention will be described in connection with the accompanying drawings, in which:

FIG. 1 is a perspective view, partially diagrammatic and not all to the same scale, of the system of the invention with a turntable platform and one control panel greatly enlarged;

FIG. 2 is a plan view of a rectilinear platform of the invention;

BEST MODE FOR CARRYING OUT THE INVENTION

Figure 3:
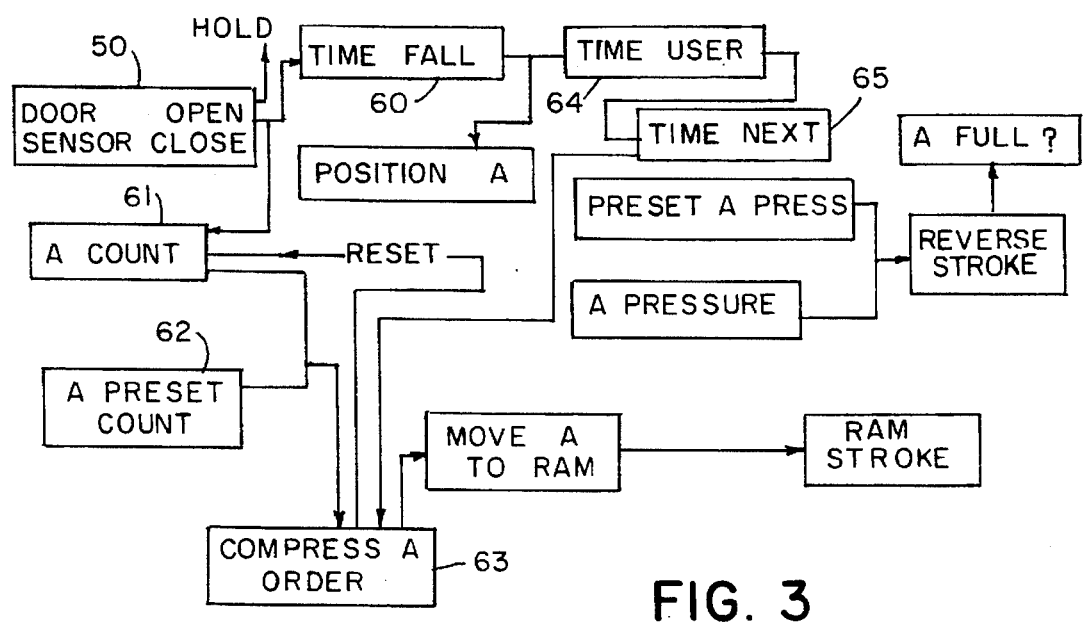
FIG. 3 is a flow chart of the compaction operation.

Referring now first to FIG. 1, a waste chute i has an access door 2 on each floor 3 of a multi-story building. These structures may be of the type well known in the art. To dispose of waste, a tenant 9 carries a container 10 of separated waste to the access door 2 on his floor. At control panel 11 adjacent the door, he pushes pushbutton 14 to select a receptacle 7 in the basement to correspond to the type of waste he wishes to dispose (paper in this case). All the control panels are operatively connected to central control 12. Beneath the chute 1, in the basement, a platform 4 holds a set of waste receptacles 7, one for each type of separated waste, such as clear glass, colored glass, aluminum, paper and all other wastes or garbage. The movable platform 4 is a turntable that is rotated by motor 5. A position sensor 6 senses the rotary position of the platform 4. The central .control 12 operates the motor 5 that cooperates with the magnetic position sensor 6 in a servo relationship to rotate the platform 4 until the selected (paper) receptacle is directly beneath chute 7.

A door sensor 50 and lock assembly 13 at each door 2 is also connected to the central control 12. While the platform is moving, the central control 12 locks all the door locks to prevent waste falling while receptacles are moving. If any door is open, its door sensor 50 will communicate that information to the central control 12 which may inhibit operation of motor 5 and platform motion. For female tenant read she and her for he and his.

When the selected receptacle is in position as determined by position sensor 6, the motor 5 stops, the lock at the door of the user opens and the selected item 15 on every control panel 11 lights up. A sonic indicator 16 sounds to notify that the system is ready for the user to open the door to deposit the selected waste. The door sensor 50 senses when the door closes. This initiates a fall time interval during which the turntable will not rotate. This fall time interval is determined by the elevation of a particular door to allow time for light items to fall into the receptacle before the receptacle moves.

When any door is unlocked, all the other doors are locked and the "in use" light 25 on each panel is illuminated. A duplicate panel 11 in the basement facilitates service and indicates which door has been left open. In addition, a control switch 17 provides for disabling the controls on the floors while emptying the receptacles, which illuminates the "out of service" lights 29. A power supply 19 for the system is powered by the line power and the electronic controls in the central control 12 may be of the programmed microprocessor type with multiple inputs that is well known in the art. It may indicate service problems and may telephone for service through a modem, for example.

The receptacles 7 may be provided with wheels 20 for ease in rolling down ramp 21 when full.

As shown in FIG. 2, the moving platform 4 may be of the rectilinear type that moves back and forth in a straight line to better accomodate space and geometry requirements of certain installations.

A distinct advantage of a programmable microprocessor with multiple inputs and outputs in the central control 12 of FIG. 1 is that provisions can be made at negligible cost for the future inclusion of additional categories of separated wastes. If a category is added, then an additional pushbutton and light for that category must be added at each control panel and the necessary wiring connections made. The cost of adding extra categories will be even less if the initial installation is made with the wiring, pushbutton and lights for several extra categories and the final connections at the central control 12 placed on internal switches well known in the art. In that case, adding a category simply involves applying labels to the lights on each control panel 11, and opening the central control 12 to operate a concealed switch 30 to complete the connection.

The particular sequences of operation, timing intervals and the like are controlled by the program in the microprocessor. The manufacturer of the system may provide various options that may be implemented by simply replacing the program such as by modem. This may involve replacing a separate program module or the microprocessor module when the program is on the chip with the microprocessor. The program may include various options such as a default position wherein the garbage receptacle is moved into position when there is, for example, a problem with locking a door, or all doors may be open when garbage is in position.

The microprocessor may be programmed for sophisticated service functions as:

displaying the nature of a dysfunction;

telephoning off-site for service;

increasing time delay for higher floors to allow time for refuse to fall;

signalling when a particular door is left open, and the like.

Figure 4:
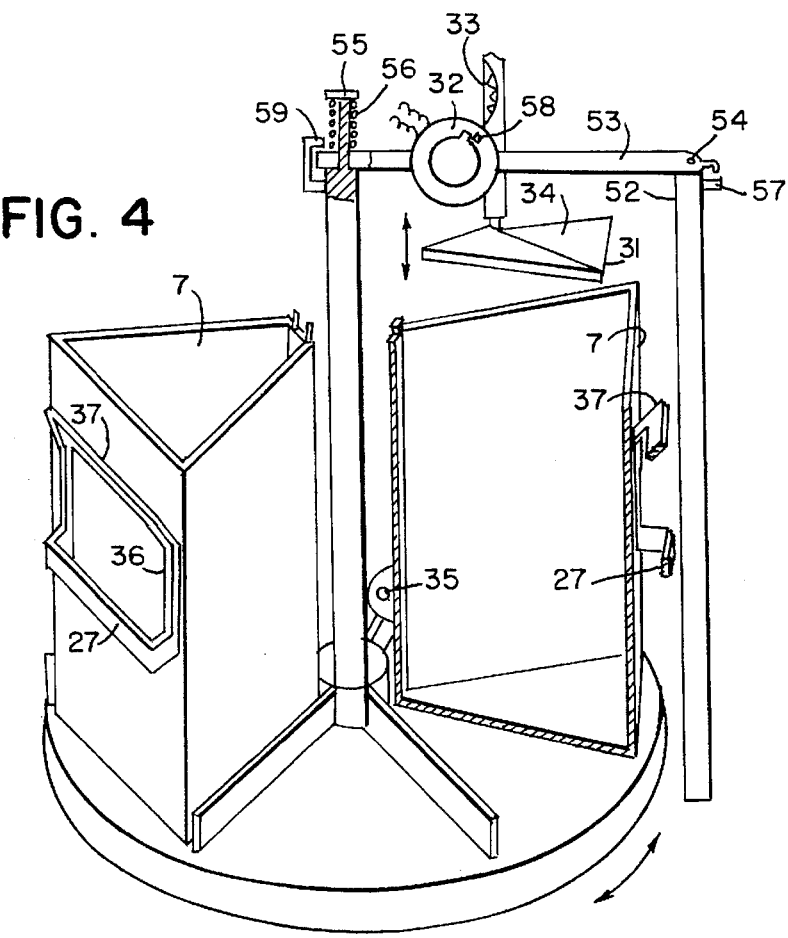
FIG. 4 is a perspective view of wedge-shaped receptacles on a turntable with reciprocating ram for compacting waste, and a receptacle partially broken away.

Referring now to FIG. 4, a rotary platform 4 holds a plurality of receptacles 7 that are wedge-shaped for enhanced capacity in a compact arrangement. Suspended over the receptacles is a ram or plunger 31 arranged to be directly over the open top of a receptacle when the receptacle has been rotated to the compressor position by the turntable. The plunger 31 is driven up and down by power drive 32 acting on rack 33. The plunger or ram 31 is arranged to compress the waste on the down stroke to thereby increase the capacity of the system and reduce the volume of waste for reduced disposal costs. The plunger 31 has a pyramidal top portion 34 to reduce trapping of waste thereon. Uprights 51, 52 support the power drive 32 on horizontal bar 53, by pivot 54 at one end and movably on pin 55 at a second end. A sturdy spring 56 opposes upward movement of the bar 53 when the ram 31 is forced against compacted refuse. When the compressive forces exceed an amount predetermined by spring 56, the bar will pivot upward and switch 57 will actuate, reversing the power drive and raising the ram to its position above the receptacle. A turn sensor 58 may provide a signal for every rotation of the motor drive. By counting the number of rotations of the drive before the lifting of the ram, the compacted depth of the waste is measured. When this number corresponds to a preset value, the controller signals that the receptacle is full and should be replaced. Other means of measuring depth of the ram well known in the mechanical arts such as the time of drive motor operation may be used as well.

An alternative means of controlling compressive forces is provided by pressure sensor 59. As the bar is forced upward, it is forced against pressure sensor 59. The signal from the sensor is proportional to the force on it, which is proportional to the force of the ram on the waste. The system is arranged to reverse the drive motor when a preset signal value is received from the sensor. This value may be set at different levels for different type wastes. It may be set so low for glass bottles, for example, that it reverses before any are broken, so that it is merely measuring how full the receptacle is.

The waste need not be compacted after every deposit. That would be unnecessary and time consuming. Instead, the system provides for compressing only after a preset number of deposits into the particular receptacle. This is accomplished by counting as a deposit each time a door is closed while the receptacle is in place.

Compaction is a time consuming operation, during which tenants must wait to move the turntable. A delay control is provided to reduce some of this waiting time to ensure that a tenant is not about to use the system when it starts to move a receptacle to the compaction position. This compaction delay time is long enough to enable the user to select another receptacle and for any other waiting users to operate the system. Every time a door closes, the compaction delay time begins again. The flow chart of FIG. 3 indicates in schematic fashion a flow chart of the operation. This may be effectively practiced by a microprocessor system in which many of the preset values are readily modified, even by modem from a remote site. Door sensor 50 indicates that a door is open and a bin A has been selected and is below the chute. The system has stored a fall time 60 related to the elevation of that door to give time for waste to fall. When sensor 50 indicates the door has closed, the fall time interval 60 begins. During this fall time interval 60 the turntable is locked, and a count is added to the Bin A count 61. This is compared to the preset Bin A count 62. If the Bin A count equals the preset count, then a compress Bin A is stored at 63 and Bin A counter is reset. This order is not executed until after fall time interval 60, followed by user time interval 65 and next user time interval 65 have expired. The user time interval is the time during which the door just closed is the only usable one. This permits a user to empty each of his containers before another floor takes over. The next user time interval 65 is an additional time interval so that a waiting user will have time to begin operation before the compress cycle takes over. Whenever another user takes over, the entire time cycle begins again. It has been found that when a user loses control after making a first deposit, he is tempted on the next use to dump all of his waste together to prevent that from happening again. This defeats the entire system. Likewise, the compress cycle is not of immediate concern relative to a waiting user. The next user time interval 65 overcomes this problem by delaying the compress operation.

The receptacles 7 are provided with handling means for emptying by both rear end and front end loading trucks with lifting hooks and side loading trucks. An eye 35 receives the lifting hook of a rear end loader. A handle assembly 36 includes an upper bar 37 that projects upward and outward to serve as a fulcrum for tilting the receptacle up as the eye is lifted.

The upper bar 37 may serve as the lifting bar for side loading trucks in combination with the lower bar 27 that serves as the locking element when the receptacle is tilted by the side loading truck.

Certain categories of waste receptacles may fill more rapidly in some installations. For example, general garbage may fill more than twice as fast as any other category, even when compressed. In situations where the turntable holds more receptacles than there are waste categories, more than one receptacle may be dedicated to a single waste category. This is easily done by programing the controller 12 in cooperation with the turntable position sensor 6. The redundant receptacles are best positioned diametrally opposed so that the time to reach either one is reduced. Since they will be randomly selected, they will usually fill at about the same rate. Then one signals full they will both usually be ready for replacement with empty bins. This arrangement greatly reduces labor costs and the time when the system is out of service.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. In a system for selective, separated collection of waste in a plurality of waste collection receptacles in a building having a plurality of floors having a chute with access door at each floor from which waste is to be collected, a receptacle mover for moving a selected one of a plurality of receptacles beneath the chute to receive a particular category of waste deposited through an access door, remote door lock means connected to each door to controllably prevent access to the chute, door sensing means for signalling when a door is closed, waste category selection means at each access door for selecting a category of waste to be received by a receptacle, and means for controlling the receptacle mover to move a receptacle beneath the chute suitable for a selected waste category while locking access doors, the improvement comprising:

compacting means for periodically compressing waste within said receptacles, said compacting means including a ram means suspended above the level of the tops of said receptacles and having vertical motion into and out of a receptacle;

compaction control means for first moving a receptacle beneath the ram means after a predetermined number of plural deposits therein; second moving said ram means into said receptacle; and third moving said ram means out of said receptacle after a predetermined pressure has been applied by said ram means.

2. The system according to claim 1, in which said means for controlling the receptacle mover includes a delay time before beginning a compaction operation to avoid interference with waste depositing operation.

3. The system according to claim 2, in which said delay time includes a time interval related to the elevation of the door last used above the receptacle to allow time for waste to fall.

4. The system according to claim 3, in which said delay time is initiated by the closing of a door as indicated by the door sensing means.

5. The system according to claim 4, in which said predetermined number of deposits is different for different categories of waste.

6. The system according to claim 5, in which said predetermined pressure is different for different categories of waste.

7. The system according to claim 6, further comprising full receptacle sensing means associated with said ram means for indicating when a receptacle is full.

8. The system according to claim 7, in which at least two receptacles are provided for a single waste category with means for substantially randomly positioning one or the other beneath the chute to substantially at least double the time intervals between emptying receptacles dedicated to a single waste category and between compactions.

9. The system according to claim 8, in which said at least two receptacles are spaced apart as far as possible on said receptacle mover to shorten the time required to position a selected receptacle beneath the chute.

10. In a system for selective, separated collection of waste in a plurality of waste collection receptacles in a building having a plurality of floors having a chute with access door at each floor from which waste is to be collected, a positioning means for positioning a selected one of a plurality of receptacles at the terminus of the chute to receive a particular category of waste deposited through an access door, remote door lock means connected to each door to controllably prevent access to the chute, door sensing means for signalling when a door is closed, waste category selection means at each access door for selecting a category of waste to be received by a receptacle, and means for controlling the positioning means for positioning a receptacle beneath the chute suitable for a selected waste category while locking access doors, the improvement comprising:

compacting means for periodically compressing waste within said receptacles, said compacting means including a ram means having motion into and out of a receptacle;

compaction control means for: first, actuating the ram means after a predetermined number of plural deposits into a particular receptacle; second, moving said ram means into said receptacle; and third, moving said ram means out of said receptacle after a predetermined pressure has been applied by said ram means.

11. The system according to claim 10, in which said means for controlling the receptacle mover includes a delay time before beginning a compaction operation to avoid interference with waste depositing operation.

12. The system according to claim 11, in which said delay time includes a time interval related to the elevation of the door last used above the receptacle to allow time for waste to fall.

13. The system according to claim 12, in which said delay time is initiated by the closing of a door as indicated by the door sensing means.

14. The system according to claim 13, in which said predetermined number of deposits is different for different categories of waste.

15. The system according to claim 14, in which said predetermined pressure is different for different categories of waste.

16. The system according to claim 15, further comprising full receptacle sensing means associated with said ram means for indicating when a receptacle is full.

17. The system according to claim 16, in which at least two receptacles are provided for a single waste category with means for substantially randomly positioning one or the other beneath the chute to substantially at least double the time intervals between emptying receptacles dedicated to a single waste category and between compactions.

18. The system according to claim 17, in which said at least two receptacles are spaced apart as far as possible to shorten thereby the time required to position a selected receptacle at the terminus of the chute.

19. The system according to claim 10, in which said ram means is suspended above the level of the tops of said receptacles and having vertical motion into and out of said receptacles.

* * * * *